United States Patent [19]

Tsutsui

[11] Patent Number: 5,572,585
[45] Date of Patent: Nov. 5, 1996

[54] COMMUNICATION SYSTEM AND CALL PROCESSING METHOD

[75] Inventor: Yuichiro Tsutsui, Yokohama, Japan

[73] Assignee: Canon Kabushi Kaisha, Tokyo, Japan

[21] Appl. No.: 212,695

[22] Filed: Mar. 14, 1994

Related U.S. Application Data

[63] Continuation of Ser. No. 965,576, Oct. 23, 1992, abandoned, which is a continuation of Ser. No. 588,460, Sep. 26, 1990, abandoned.

[30] Foreign Application Priority Data

| Sep. 28, 1989 | [JP] | Japan | 1-254608 |
| Dec. 1, 1989 | [JP] | Japan | 1-312995 |
| Dec. 1, 1989 | [JP] | Japan | 1-312996 |
| Dec. 1, 1989 | [JP] | Japan | 1-312997 |
| Dec. 1, 1989 | [JP] | Japan | 1-312998 |

[51] Int. Cl.$^6$ .......... H04M 3/00; H04M 11/00; H04J 3/24; H04J 3/12
[52] U.S. Cl. .......... 379/242; 370/94.1; 370/110.1; 379/94; 379/96; 379/164; 379/233; 379/243
[58] Field of Search .............. 379/93, 94, 96, 379/97, 98, 100, 211, 242, 243, 244, 164, 233, 234, 247; 370/95.2, 94.1, 110.1

[56] References Cited

U.S. PATENT DOCUMENTS

| 4,688,170 | 8/1987 | Waite et al. | 379/93 |
| 4,852,151 | 7/1989 | Dittakavi et al. | 379/93 X |
| 4,873,717 | 10/1989 | Davidson et al. | 379/164 |
| 4,910,609 | 3/1990 | Nicholas et al. | 358/433 |
| 4,922,534 | 5/1990 | Gorniak et al. | 379/98 |
| 4,958,153 | 9/1990 | Murata et al. | 379/142 X |
| 4,961,185 | 10/1990 | Sawada | 370/79 |
| 4,995,074 | 2/1991 | Goldman et al. | 379/97 |
| 5,023,868 | 6/1991 | Davidson et al. | 379/93 X |
| 5,050,005 | 9/1991 | Kagami | 379/100 X |
| 5,276,687 | 1/1994 | Miyamoto | 379/100 X |

FOREIGN PATENT DOCUMENTS

| 0375032 | 6/1990 | European Pat. Off. . |
| 58-138155 | 8/1983 | Japan . |
| 60025352 | 2/1985 | Japan . |
| 60-165154 | 8/1985 | Japan . |
| 0085466 | 3/1989 | Japan | 379/211 |
| 0109952 | 4/1989 | Japan | 379/94 |
| 1202962 | 8/1989 | Japan . |
| 9003702 | 4/1990 | WIPO | 379/233 |

OTHER PUBLICATIONS

Philips Telecommunication Review, vol. 47, No. 1, Mar. 1969, Hilversum NL, pp. 1–14, Klik, "The SOPHO–SET family of digital telephone terminals for SOPHO–S–P–ABXs".
NTG–FACHBERICHTE, 25 Mar. 1985, Berlin, pp. 112–119, Koenig et al., "D–Kanal–protokoll im ISDN–Pilotprojekt".
Computer Communications, vol. 11, No. 4, Aug. 1988, Guildford GB, pp. 171–176, E. Peel, "International extension of ISDN and Terminal Implications".
COMMUTATION ET TRANSMISSION, vol. 9, No. 3, 1987, Paris, Fr., pp. 19–34, M. Clost et al., "Les characteristiques du RNIS".

*Primary Examiner*—Jeffery Hofsass
*Assistant Examiner*—Harry S. Hong
*Attorney, Agent, or Firm*—Fitzpatrick, Cella, Harper & Scinto

[57] ABSTRACT

A communication system and a call processing method, with which a communication attribute of an incoming call or a held call is recognized, and the call is processed on the basis of matching characteristics of the communication attributes of accommodated terminals. When the call does not match with a given terminal in terms of a communication attribute, an associated message is displayed. When a given terminal is matched with the call within an allowable range of its communication attribute, the attribute of the given terminal is set to match with a requested communication attribute simultaneously with a response to the call by the given terminal.

73 Claims, 15 Drawing Sheets

| CLASS | PERMISSIBLE COMMUNICATION ATTRIBUTE |
|---|---|
| CLASS 1 | VOICE COMMUNICATION ONLY |
| CLASS 2 | VOICE + RS - 232C<br>ASYNCHRONOUS / CIRCUIT SWITCHING<br>STOP BIT : 1 / 1.5 / 2<br>DATA BIT LENGTH : 5 / 7 / 8<br>PARITY : NONE / EVEN / ODD<br>RATE : 300~9600 bps |
| CLASS 3 | SYNCHRONOUS / CIRCUIT SWITCHING<br>RATE : 64 Kbps |

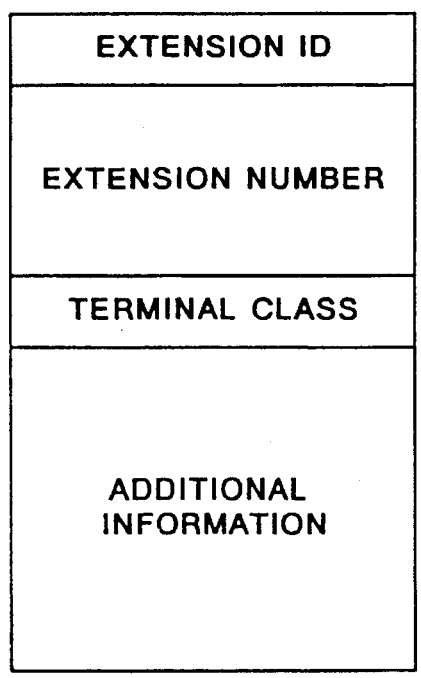
FIG.3(A) MEMORY FORMAT
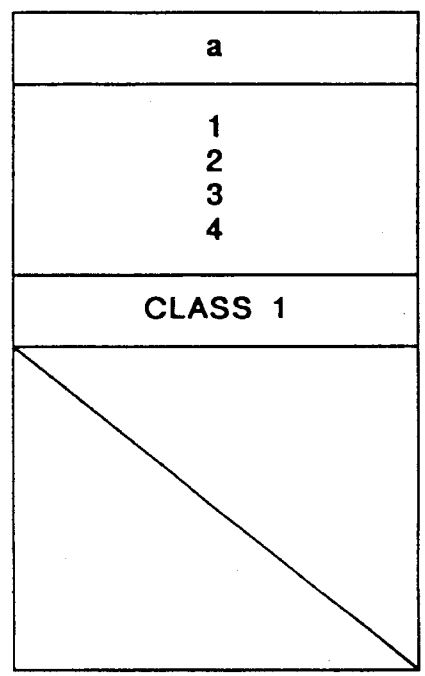
FIG.3(B) EXAMPLE OF KEY TELEPHONE SET 9
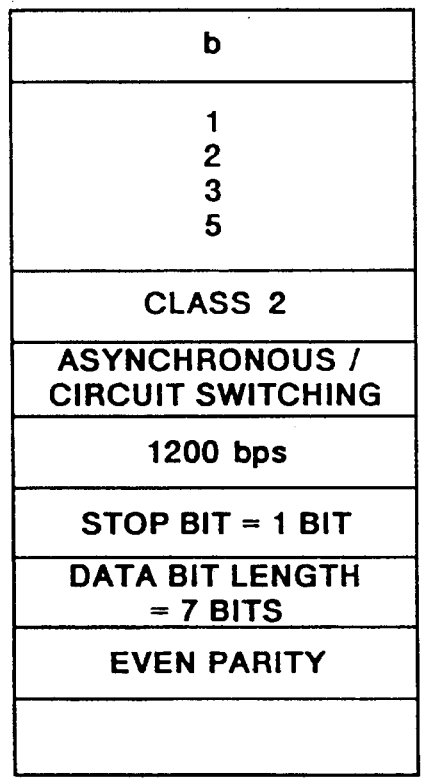
FIG.3(C) EXAMPLE OF DATA ADAPTER TELEPHONE SET 10
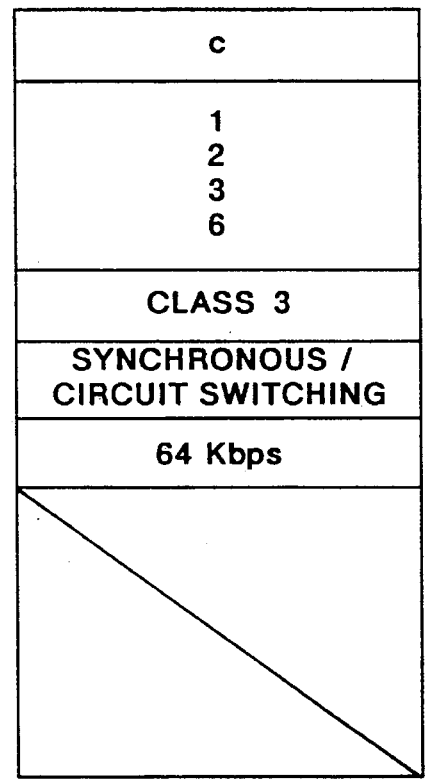
FIG.3(D) EXAMPLE OF DATA ADAPTER TELEPHONE SET 11

| CALL STATUS |
|---|
| OWN TERMINAL ID |
| OUTSIDE LINE TYPE : NUMBER |
| ADDITIONAL INFORMATION |

FIG.4(A) MEMORY FORMAT

| HELD |
|---|
| b |
| ISDN LINE 1 |
| ASYNCHRONOUS / CIRCUIT SWITCHING |
| 9600 bps |
| STOP BIT = 1 BIT |
| DATA BIT LENGTH = 8 BITS |
| NO PARITY |
|  |

FIG.4(B) EXAMPLE OF HELD CALL

| IN-COMMUNICATION |
|---|
| b |
| ISDN LINE 2 |
| ASYNCHRONOUS / CIRCUIT SWITCHING |
| 1200 bps |
| STOP BIT = 1 BIT |
| DATA BIT LENGTH = 7 BITS |
| EVEN PARITY |
|  |

FIG.4(C) EXAMPLE OF IN-COMMUNICATION CALL

| CLASS | PERMISSIBLE COMMUNICATION ATTRIBUTE |
|---|---|
| CLASS 1 | VOICE COMMUNICATION ONLY |
| CLASS 2 | VOICE + RS - 232C <br><br> ASYNCHRONOUS / CIRCUIT SWITCHING <br><br> STOP BIT : 1 / 1.5 / 2 <br><br> DATA BIT LENGTH : 5 / 7 / 8 <br><br> PARITY : NONE / EVEN / ODD <br><br> RATE : 300 ~ 9600 bps |
| CLASS 3 | SYNCHRONOUS / CIRCUIT SWITCHING <br><br> RATE : 64 Kbps |

FIG. 5

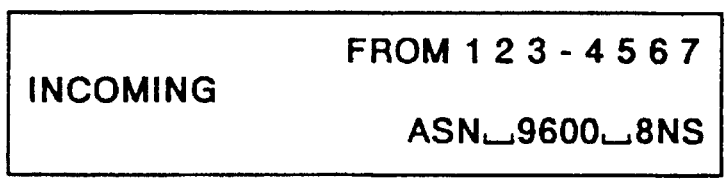
FIG.6(A) INCOMING CALL DISPLAY
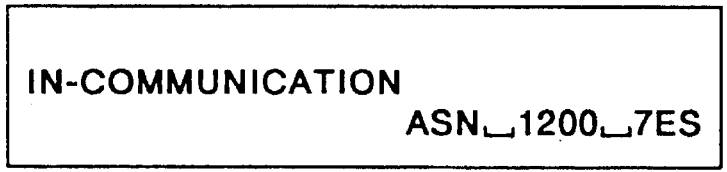
FIG.6(B) IN-COMMUNICATION CALL DISPLAY
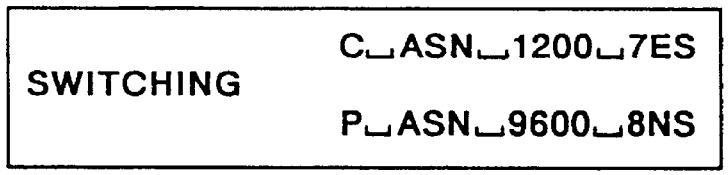
(UPPER ROW INDICATES INFORMATION OF ONGOING CALL)
(LOWER ROW INDICATES INFORMATION OF HELD CALL)
FIG.6(C) IN-COMMUNICATION BY SWITCHING
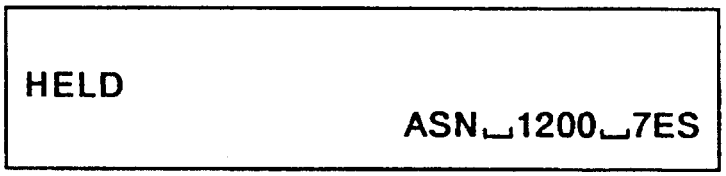
FIG.6(D) HELD CALL DISPLAY
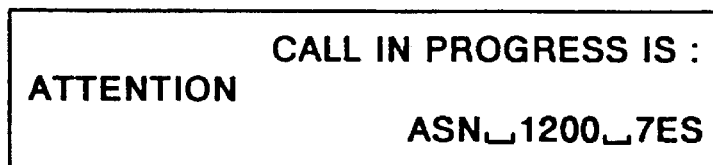
FIG.6(E) DISPLAY EXAMPLE OF CHANGED COMMUNICATION ATTRIBUTE SETUP

COMMUNICATION SYSTEM AND CALL PROCESSING METHOD

This application is a continuation of application Ser. No. 07/965,576 filed on Oct. 23, 1992, now abandoned, which is a continuation application of Ser. No. 07/588,460, filed on Sep. 26, 1990, now abandoned.

BACKGROUND OF THE INVENTION

1. Field of the Invention

The present invention relates to a communication system which accommodates a plurality of lines and a plurality of terminals, and matches a communication attribute of an incoming call or a held call with that of a terminal to respond to the call, and a call processing method.

2. Description of the Prior Art

When a data communication is performed through a communication system, and, for example, another incoming call is detected, the detected call is informed to a user as an in-communication incoming call via a data adapter connected to a data terminal. Furthermore, when information, associated with the incoming call, of a caller or a calling party who requests a new data communication is informed to the user, the user can determine whether the present communication should be maintained or the new incoming call should be preferentially processed, thus helping to improve response capabilities. More specifically, in some cases, the user wants to start the new communication while interrupting the present data communication depending on the caller's information. Thus, such a requirement of the user can be satisfied.

In a communication network having a function of sending caller information to a called party prior to the start of a communication, the above-mentioned operations are available. For example, in an ISDN which has been developed as an integrated digital service network, and is expected to provide various information communication services, caller information including a caller number is transmitted to a called party. Therefore, by utilizing this information, a user can be informed of the caller upon detection of an in-communication incoming call.

In a conventional communication system accommodating a plurality of lines and a plurality of terminals, when a given terminal responds to a new incoming call after a line in communication is held or is disconnected, or when the given terminal places a line on hold to perform a new communication and then responds to the held call, or responds to a held call which was held by another terminal, a user must change setup data to match a communication attribute requested by a call to be responded to with that of a terminal or a data adapter.

In a communication system of this type, there is no correlation between a display of an incoming call or a held call on a terminal and a communication capability or communication attribute of the terminal itself which makes the call display.

The communication attribute indicates information such as a transmission rate, a bit format (e.g., a stop bit, a data bit length, a parity bit type, and the like), a distinction between a synchronous/asynchronous communication, a character type, flow control information, a media type (e.g., voice/G3 FAX/G4 FAX/document information, and the like), and the like, and such information serves as agreement of a communication format with a communication station on the other end of a line or with a network for transmitting information in some cases.

The data adapter is an adapter used by a communication system such as an exchange system to accommodate data terminals and to exchange data. Some data adapters support a sequence such as V.25bis, X.21, or the like for automatically originating an outgoing call and answering an incoming call, and some other adapters can only match a data terminal with a modem pool in a system connected to the data terminal via an interface port and do not support the communication sequence itself at all. Furthermore, a section which supports data communication as a function of a stand-alone terminal is often called a data adapter.

In the above-mentioned prior art, a user of a communication system cannot determine a communication capability or a communication attribute of a terminal on the basis of an incoming call display or a held call display on the terminal. For this reason, the user often responds to the incoming call or held call using a wrong terminal which cannot be matched with a communication attribute requested by the incoming call or held call.

After the user responds to the incoming call or held call using the terminal which cannot be matched with the requested communication attribute, he or she often performs such a wasteful operation as looking for a terminal having a communication attribute which can respond to the incoming call or held call and transferring that call, or disconnecting the call because he or she cannot transfer the call.

More specifically, when a user responds to, e.g., an incoming call, he or she must temporarily hold or disconnect an ongoing call, and then change a communication attribute of the terminal and also setup data of a data adapter to which the terminal is connected. After the setup data are changed, the user then responds to the incoming call to cope with the above-mentioned in-communication incoming call. However, since a user must hold or disconnect a call, change setup data, and then respond to a call, such a sequence requires much labor and time. Even if a means capable of disconnecting and responding to a call in a series of operations is adopted, setup data of both the terminal and the data adapter must be changed as needed depending on operations of a user.

The prior art requires changing setup data of both the terminal and the data adapter, if necessary, in addition to operations to hold or disconnect a call and respond to the incoming call which are very troublesome for a user. Therefore, a caller may give up the call during these operations, and if the incoming call to be responded is stopped, a user cannot start a desired communication, and consequently fails to switch communications.

Setup change operations are done by a user may lead to an operation error or a setup error. When these errors occur, a communication often cannot be started, resulting in disadvantages and inconvenience.

In accordance with integration of communication services like in the ISDN and terminals tend to have hybrid functions, it becomes difficult for the prior art to cope with necessity of processing calls with various communication attributes on a single line or channel, and to cope with incoming calls and held calls having various communication attributes accordingly, resulting in a communication system very inconvenient for a user.

SUMMARY OF THE INVENTION

The present invention has been made in consideration of the above situation, and has as its object to provide a communication system and a call processing method where a user can respond to a call regardless of matching between a communication attribute of a terminal and that requested by a call.

It is another object of the present invention to provide a communication system in which a terminal disconnects or releases an in-communication call, and a communication attribute of the terminal is set to match with a communication attribute of the incoming call when the terminal responds to the incoming call.

It is still another object of the present invention to provide a communication system for displaying an incoming call so as to show the incoming call at a terminal which matches with a communication attribute of the incoming call and the incoming call at a terminal which does not match with a communication attribute of the incoming call.

It is another object of the present invention to provide a communication system for setting a communication attribute of a terminal to match with a communication attribute of a held call when the terminal responds to the held call.

It is a further object of the present invention to provide a communication system, in which a terminal places an in-communication call on hold, and a communication attribute of the terminal is set to match with a communication attribute of the incoming call when the terminal responds to the incoming call.

It is another object of the present invention to provide a communication system, for displaying a held call so as to show the held call at a terminal which matches with a communication attribute of the held call and the held call at a terminal which does not match a communication attribute of the held call.

It is still another object of the present invention to provide a call processing method in a communication system, comprising the steps of specifying a terminal having a communication attribute matching with a communication attribute requested by a call and setting the communication attribute of the terminal to match with the communication attribute of the call.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3(A) shows a memory format of an extension setting memory in the communication system according to the embodiment;

FIG. 3(B) shows an example of a setup format of the extension setting memory for a key telephone set 9;

FIG. 3(C) shows an example of a setup format of the extension setting memory for a data adapter telephone set 10;

FIG. 3(D) shows an example of a setup format of the extension setting memory for a data adapter telephone set 11;

FIG. 4(A) shows a memory format of a call information memory in the communication system according to the embodiment;

FIG. 4(B) shows an example of a held call stored in the call information memory;

FIG. 4(C) shows an example of an ongoing call stored in the call information memory;

FIG. 5 is a table showing a correspondence between communication attributes of a terminal accommodated in the communication system and classes according to the embodiment;

FIG. 6(A) shows an example of an incoming call display on a display unit of the terminal accommodated in the communication system according to the embodiment;

FIG. 6(B) shows a display example of an in-communication status;

FIG. 6(C) shows a display example of switching calls in-communication;

FIG. 6(D) shows an example of a held call display;

FIG. 6(E) shows a display example of changed communication attribute setup; and

DESCRIPTION OF THE PREFERRED EMBODIMENT

A preferred embodiment according to the present invention will now be described in detail with reference to the accompanying drawings.

Figure 1:
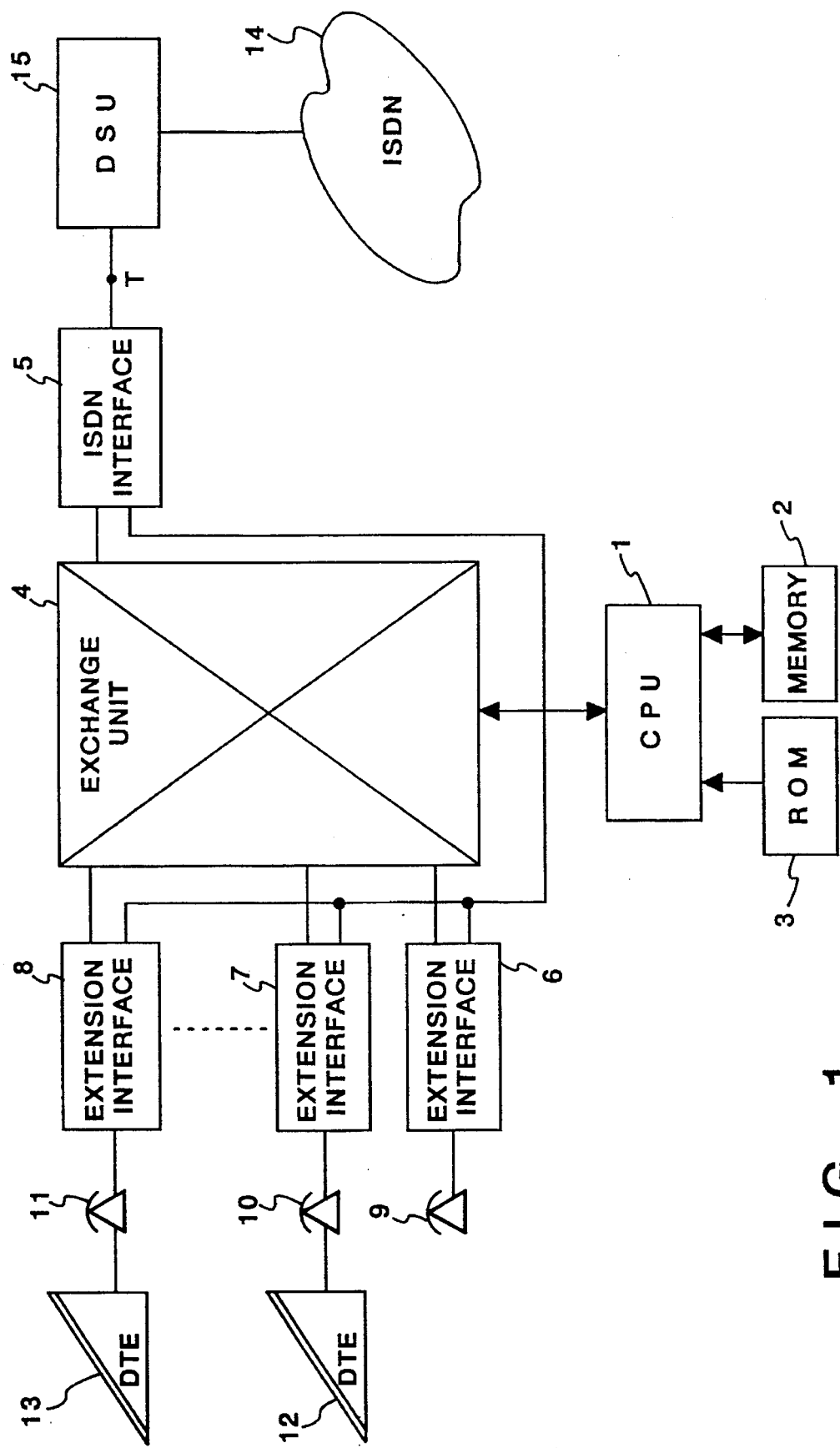
FIG. 1 is a block diagram of a communication system according to an embodiment of the present invention.

FIG. 1 is a block diagram of a communication system according to one preferred embodiment of the present invention.

In FIG. 1, reference numeral 1 denotes a central processing unit (CPU) for controlling interfaces, terminals, and the entire system; 2, a memory for storing control data, setup data, and the like; and 3, a ROM for storing a call processing program, and various other control programs. Reference numeral 4 denotes an exchange unit comprising, e.g., time-division switches; 5, an ISDN interface which accommodates an ISDN line from an integrated services digital network (ISDN) 14 via a digital service unit (DSU) 15, and has a protocol processing section for ISDN layers "1", "2", and "3", and a V.110 rate adaptation section, and the like; and 6 to 8, extension interfaces for accommodating telephone sets exclusively used for the communication system.

Reference numeral 9 denotes a key telephone set which comprises, e.g., a key pad, a loudspeaker, a handset, a display unit, and the like to process only a voice communication, and is exclusively used for the communication system; and 10, a data adapter telephone set which can be connected to a data terminal equipment (DTE) 12 such as a personal computer through an internal RS-232C interface in addition to a voice communication service function of the exclusive key telephone set 9, and can change a transmission rate with the DTE 12 and a communication format such as a bit format in accordance with a command from the CPU 1. As will be described later with reference to FIG. 5, the communication format can be changed in the following combinations. That is, the transmission rate can be changed in an asynchronous mode of 300 bps to 9,600 bps, a stop bit length can be selected from 1, 1.5, and 2 bits, a data length can be set within a range of 5 to 8 bits, and a parity type can be selected from an odd parity, an even parity, and none.

Reference numeral 11 denotes a data adapter telephone set, incorporating an RS-422 interface, for performing a synchronous communication (transmission rate=64 Kbps) with a data terminal equipment (DTE) 13 such as a personal computer.

Figure 2A:
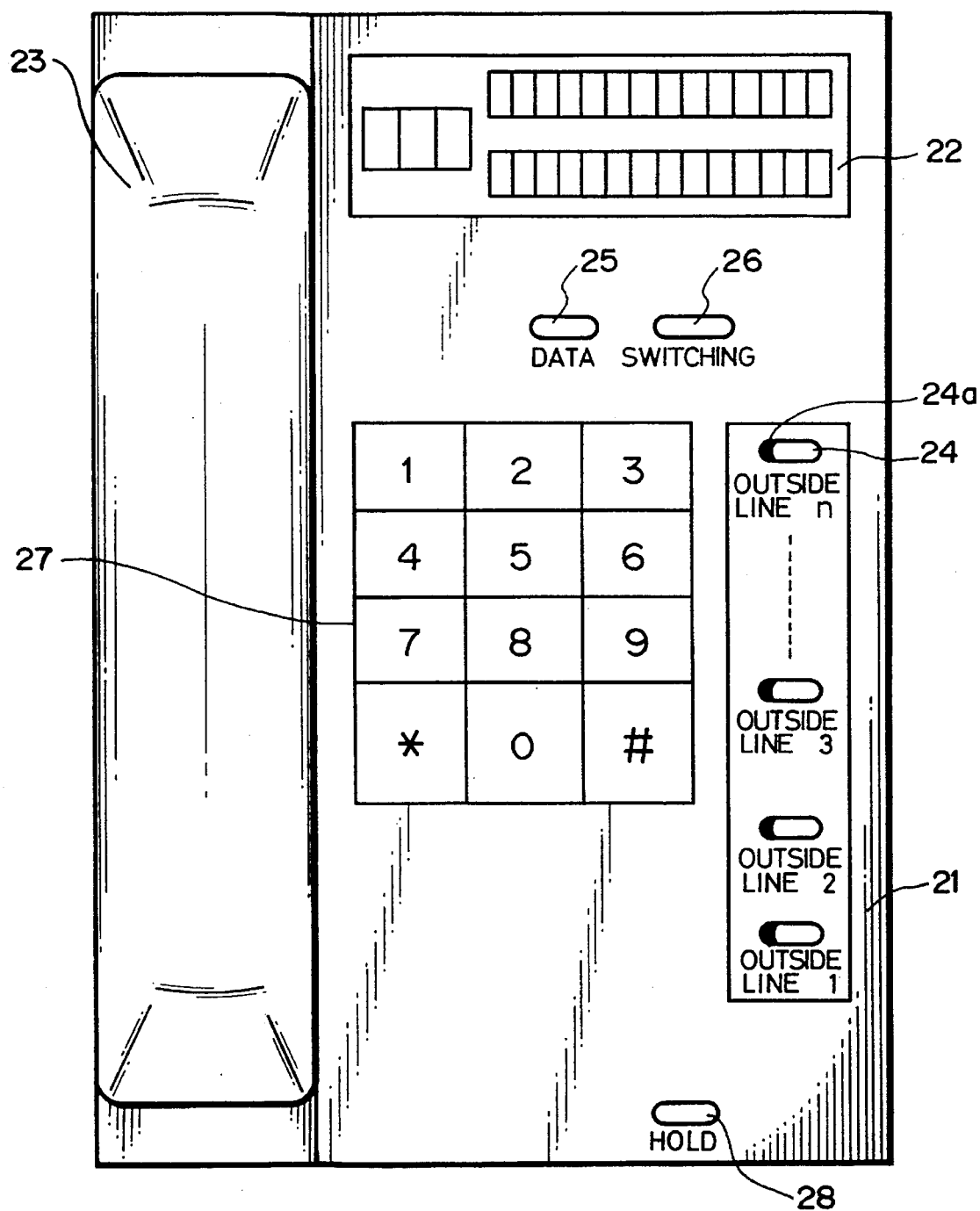
FIG. 2A is a schematic view of a panel surface of a data adapter telephone set accommodated in the communication system according to the embodiment.
Figure 2B:
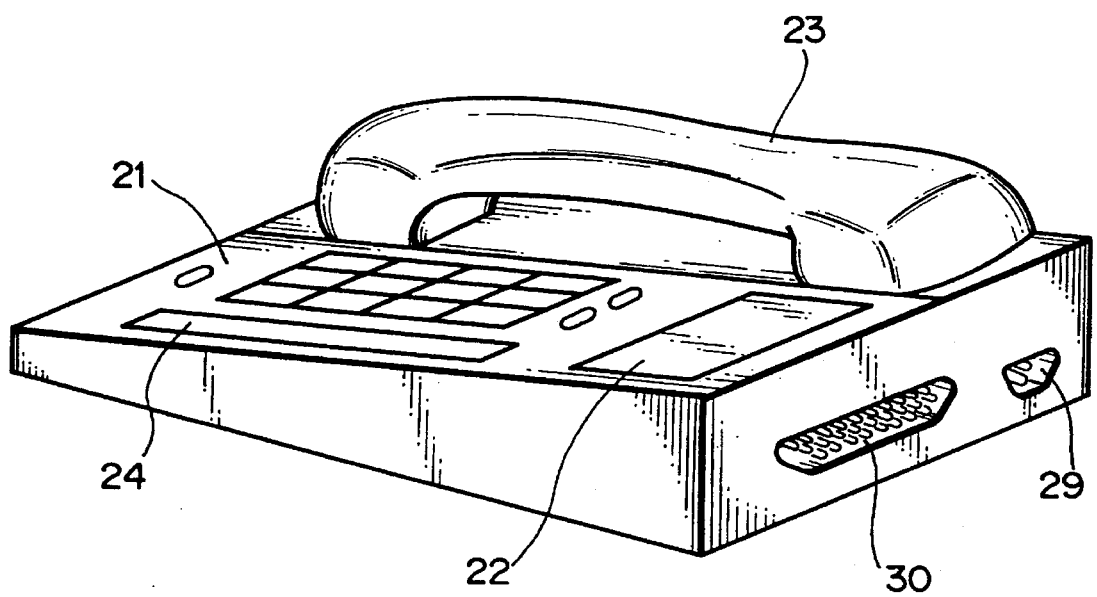
FIG. 2B is a perspective view of the data adapter telephone set.

FIGS. 2A and 2B are schematic views of the data adapter telephone set which is used to be connected to the communication system of this embodiment. FIG. 2A shows a panel surface of the data adapter telephone set, and FIG. 2B is a perspective view of the data adapter telephone set.

In FIG. 2A, reference numeral 21 denotes a main body of the data adapter telephone set; 22, a display unit, comprising, e.g., LCDs, for displaying character information, communication information, and the like; 23, a handset for a voice communication; and 24, outside line buttons each having an LED 24a for the indication of an outside line call status. Reference numeral 25 denotes a data button for initiating or terminating communication; 26, a switching button for switching communications; 27, a dial key pad; and 28, a hold button.

The LED 24a corresponding to each outside line button 24 has the following indication patterns depending on call status:

Unlit: Indicates a status wherein the corresponding outside line is not busy (not used)

Fast Flashing in Green: Indicates a status wherein the corresponding outside line is receiving an incoming call, and a response can be made Lit in Green: Indicates a status wherein the terminal equipment with that indication is in communication via the corresponding outside line Lit in Red: Indicates a status wherein other terminal equipment is in communication via the corresponding outside line, and the terminal equipment with that indication can not perform a communication with the call Slow Flashing in Green: Indicates a status wherein the terminal equipment with that indication has placed the corresponding line on hold Slow Flashing in Red: Indicates a status wherein another terminal equipment has placed the corresponding line on hold, and the terminal equipment with that indication can respond to the held line In FIG. 2B, reference numeral 29 denotes a modular jack connected to one of the extension interfaces 6 to 8 via a modular cord; and 30, a data terminal port having an RS-232C or RS-422 interface and connected to a DTE via a respective cable.

The outer appearance of the key telephone set 9 which exclusively processes a voice communication is substantially the same as that of the data adapter telephone set shown in FIG. 2B, the perspective view, except that the data terminal port 30 is omitted from the data adapter telephone set, and its illustration is not shown here.

FIGS. 3 (A) to 3D show a format and setup examples of the extension setting memory in the communication system of this embodiment.

FIG. 3(A) shows the memory format of the extension setting memory, which consists of an extension ID, an extension number, a terminal class, and a communication format, e.g., a setup transmission rate as additional information for the corresponding extension in, e.g., a data adapter telephone set. FIGS. 3B to 3D show setup examples of the extension setting memory. FIG. 3(B) exemplifies a case of the key telephone set 9. In FIG. 3(B), the extension ID is set to "a", the extension number is set to "1234", and the terminal class is set to "class 1" exclusively for a voice communication. FIG. 3(C) exemplifies a case of the data adapter telephone set 10. In FIG. 3 (C), the extension ID is set to "b", the extension number is set to "1235", and the terminal class is set to "class 2" which can deal with a voice communication and a DTE having an RS-232C interface. In addition, in the communication format (attribute), the transmission rate is set to a 1,200-bps asynchronous mode, the stop bit is set to "1 bit", the data bit length is set to "7 bits", and a parity is even. FIG. 3(D) shows a setup example of the data adapter telephone set 11. In FIG. 3 (D), the extension ID is set to "c" the extension number is set to "1236", the terminal class is set to "class 3" which can process a voice communication and connection of a DTE having an RS-422 interface, and a communication format (attribute) is set such that a terminal in a synchronous circuit switching mode communicates at a rate of 64 Kbps.

These setup data can be desirably set by a user according to each terminal, or can be automatically set by the CPU of the communication system. The extension number also corresponds to an ISDN subaddress.

FIGS. 4A to 4C show a format and examples of stored information of the call information memory in the communication system of this embodiment.

FIG. 4 (A) shows a memory format of the call information memory, and stores a call status, the extension ID of its own terminal, an outside line type and its number, and additional information (e.g., a communication format) with respect to a call.

FIG. 4 (B) exemplifies a case of a held call. FIG. 4 (B) shows call information indicating that a call from a caller which is connected via the 1st channel of the ISDN line is being held by an extension having the extension ID "b", and that, as a communication attribute, "an asynchronous circuit switching mode", "a transmission rate=9,600 bps", "a stop bit=1 bit", "a data bit length=8 bits", and "no parity" are set FIG. 4 (C) exemplifies a case of an ongoing call. FIG. 4 (C) shows call information indicating that the corresponding terminal with the extension ID "b" is connected to a caller through the 2nd channel of the ISDN line, and that, as a communication attribute, "an asynchronous circuit switching mode", "a transmission rate=1,200 bps", "a stop bit=1 bit", "a data bit length=7 bits", and "an even parity" are set FIG. 5 shows communication attributes and corresponding classes which can be permitted by the terminals (the exclusive key telephone set and the data adapter telephone sets) of the communication system of this embodiment. "Class 1" corresponds to the exclusive key telephone set 9, "class 2" corresponds to the data adapter telephone set 10, and "class 3" corresponds to the data adapter telephone set 11.

FIGS. 6A to 6E show display examples on the display units of the exclusive key telephone set and the data adapter telephone sets.

FIG. 6(A) shows a display example of an incoming call in which a caller's number is "123-4567", and the call requests an asynchronous/circuit switching data communication to have "9,600 bps", "a data bit length=8 bits", "no parity", and "a stop bit=1 bit". FIG. 6(B) shows a display example wherein an asynchronous/circuit switching communication is being performed to have 1,200 bps, "data bit length=7 bits", "an even parity", and "a stop bit=1 bit". FIG. 6(C) shows a display example wherein a single telephone set processes two types of calls, i.e., a terminal is selectively in communication with one call while the other call is being held.

FIG. 6(D) shows a display example of a case wherein the ongoing call shown in FIG. 6(B) is held, and FIG. 6 (E)

shows a display example of a case wherein a setup communication attribute of a terminal is automatically changed.

The call processing sequence by the CPU 1 of the communication system of this embodiment will be described below with reference to the flow charts of FIGS.7A to 7I. In the following description, a "terminal" indicates both the exclusive key telephone set and the data adapter telephone set unless otherwise specified.

Figure 7A:
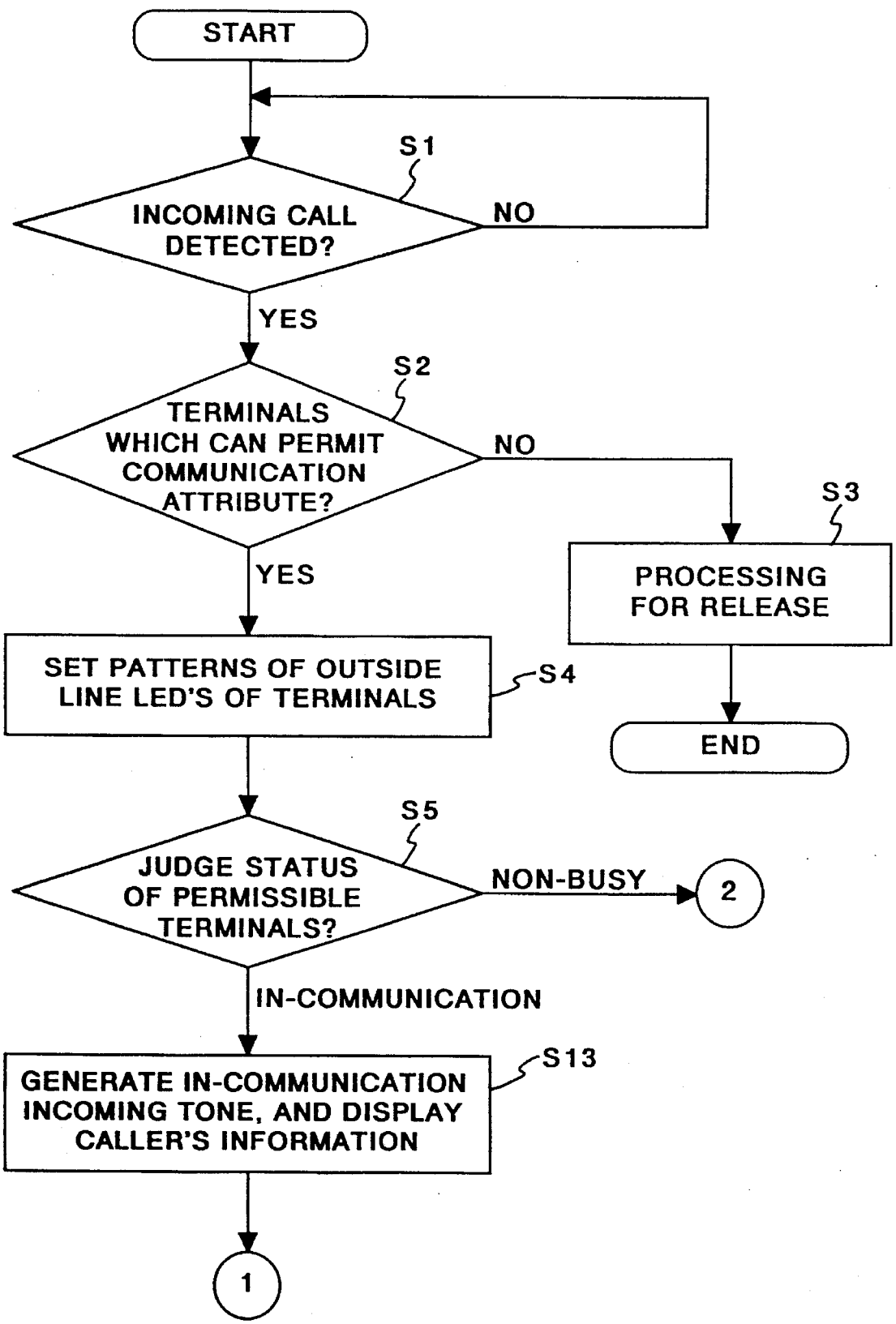
FIGS. 7A to 7I are flow charts showing a call processing sequence of a CPU in the communication system according to the embodiment.
Figure 7B:
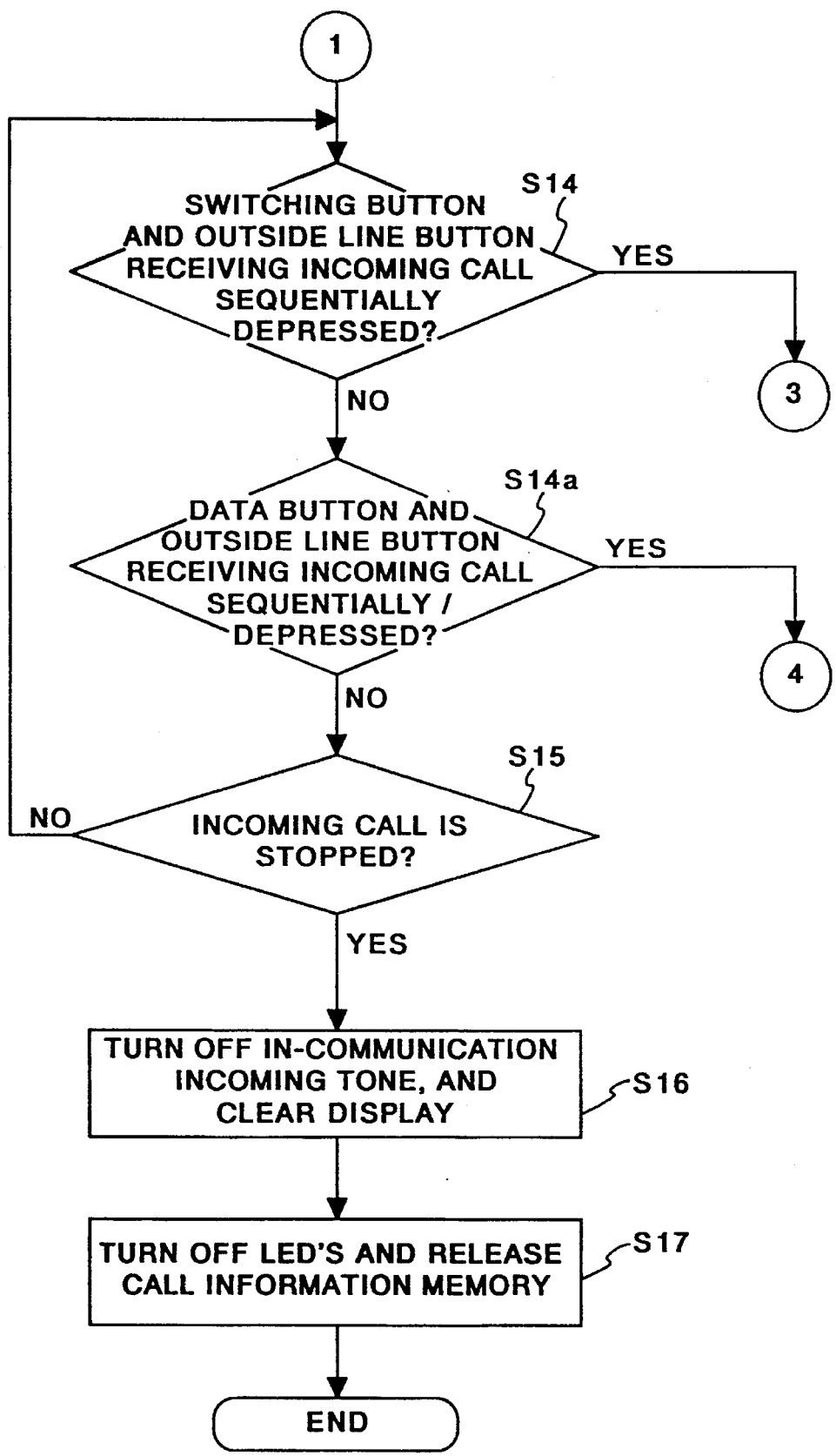

In step S1 in FIG. 7A, the presence/absence of an incoming call with respect to the communication system of this embodiment is determined on the basis of a call setup message received by the ISDN interface 5 from the ISDN 14 via the DSU 15. When an incoming call is detected, the CPU 1 sets information of the incoming call in the call information memory in step S2, and confirms a possibility of communication, i.e., whether or not a terminal is accommodated in the communication system which can be matched with the communication attribute of the incoming call. More specifically, it is checked if the incoming call can be matched with terminal attribute classes "1" to "3" shown in FIG. 5. For example, when a caller designates "transfer capability=unrestricted digital", "asynchronous 9,600 bps", "stop bit =1 bit", "data bit length=8 bits", "no parity", and "V.110 rate adaptation" as transmission capability information elements (or low layer matching information elements), and the received subaddress is "1235" to request a data communication via the data adapter telephone set 10, the required data communication is permitted. However, when a G4 FAX communication is designated although the subaddress is "1235" to designate the data adapter telephone set 10, the corresponding call is not accepted.

If it is determined as a result of confirmation of a communication possibility that there are no terminals which can be matched with the communication attribute of the incoming call and communication impossible, the reason for the impossible communication is displayed and the incoming call is rejected by a release completion message accompanying an unconformity of terminal attribute in step S3, thus releasing the call information memory and ending processing.

However, if it is determined in step S2 that there are terminals which can permit the communication attribute of the incoming call, the flow advances to step S4, and an LED, corresponding to an incoming outside line, of the permissible terminal are set to a pattern (fast flashing in green) indicating that incoming processing can be executed, and LEDs of other nonpermissible terminals are set to a pattern (lit in red) indicating that another terminal is executing the incoming processing. In step S5, status of all the permissible terminals is checked, and processing according to the detected status is then executed.

Figure 7C:
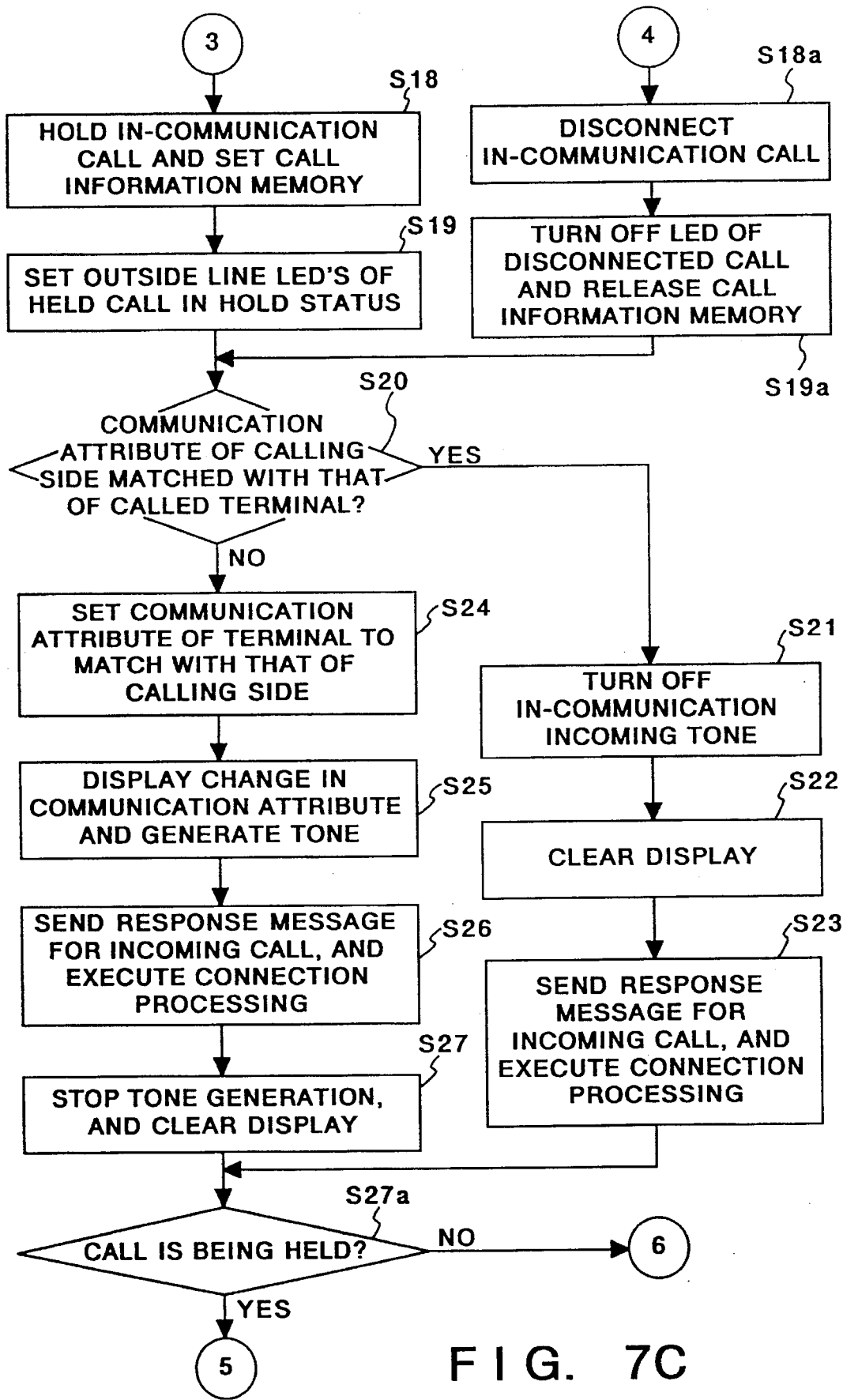
Figure 7D:
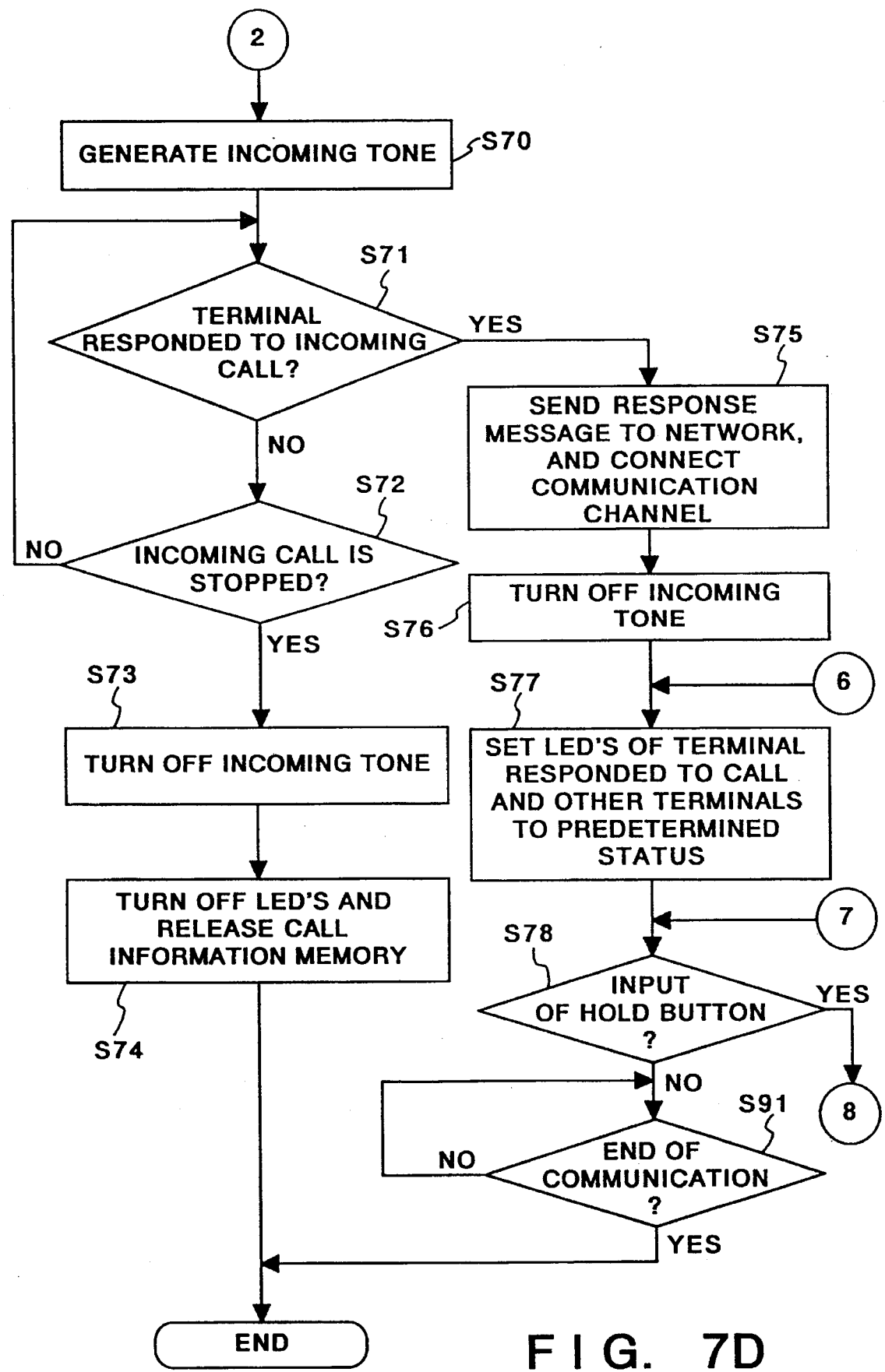
Figure 7E:
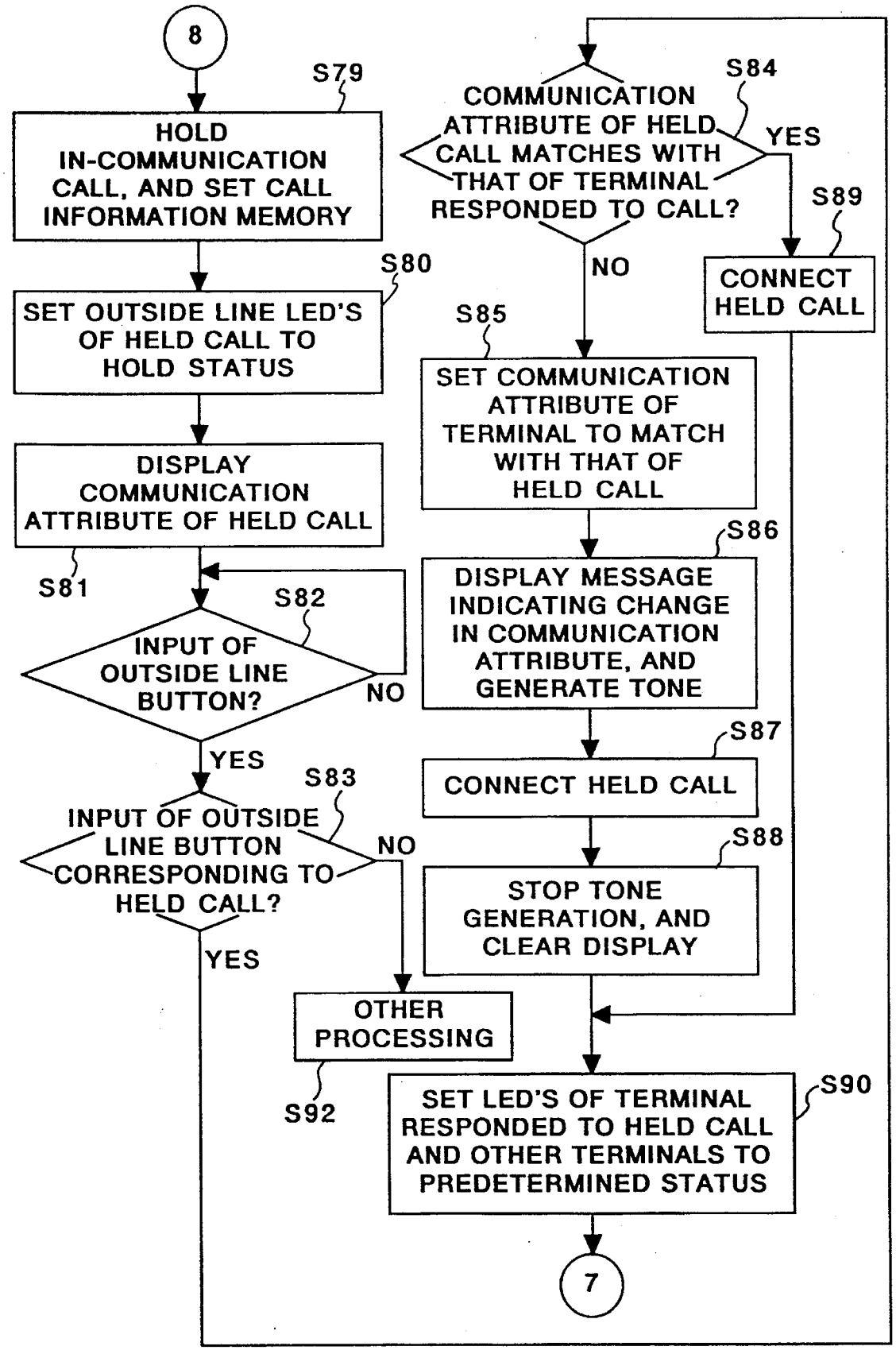

As processing for non-busy terminals, an incoming tone is generated in step S70 in FIG. 7D, and in steps S71 and S72, a response to an incoming call at a called terminal and a halt of an incoming call by abandonment at a calling side are monitored, respectively. If the terminal (called terminal) responds to the call before the incoming call stops, the flow advances to step S75, and a response message is sent to the ISDN. Then a communication channel is connected to the ISDN, and the incoming tone is stopped in step S76.

In step S77, the outside line LED of the responding terminal is steadily lit in green indicating that the terminal is in communication, and the outside line LEDs of other terminals are lit in red indicating that another terminal is in communication.

However, if the incoming call stops before a response, the incoming tone is turned off in step S73, and flashing or lit LEDs in correspondence with the incoming call are turned off in step S74. Then, the terminals, the interfaces, and call information memory are released to be set in a release state, thus ending processing.

In step S78, an input of the hold button at the terminal in communication is monitored. If the button input is detected, the flow advances to step S79 in FIG. 7E; otherwise, a completion of the communication is monitored in step S91. In step S79, the ongoing call is held, and the call information memory is set in correspondence with the hold operation. In step S80, the outside line LED corresponding to the held call of the terminal at which the hold operation is performed is set to a slow flashing in green, and those of other terminals are set to a slow flashing in red or a steady lit in red in correspondence with the communication attributes of the terminals. In step S81, the communication attribute of the held call is displayed on the terminal in hold condition.

In step S82, an input of the outside line button is monitored. It is checked in step S83 if the input of the outside line button corresponds to the held call. If it is determined in step S83 as a result of checking that the input of the outside line button corresponds to the held call, the flow advances to step S84 to check if a terminal responding to the held outside line has a communication attribute which matches with that of the held call. If the communication attribute of the terminal matches, the held call is connected to the terminal in step S89; otherwise, the communication attribute of the terminal is set to match with that of the held call in step S85.

In step S86, a message indicating that the communication attribute of the terminal has been changed is displayed on the terminal which has responded to the held call, and a tone is generated at the terminal. In step S87, the held call is connected to the terminal. In step S88, the display and tone generation executed in step S86 is processed to stop. In step S90, the corresponding outside line LED on the terminal responded to the held call is set to a steady lit in green indicating that the terminal is in communication, and the corresponding LEDs of other terminals are lit in red. The flow then returns to step S78 in FIG. 7D.

If it is recognized in step S5 in FIG. 7A that the terminal is in communication, an in-communication incoming tone is generated and caller's information (caller's number, transmission rate, bit format, and the like) is displayed at the terminal in step S13 (see the display example in FIG. 6(A)). In the following step, step S14 in FIG. 7B, depressions of the switching button 26 and the outside line button 24 whose LED is flashing in correspondence with the incoming call are monitored. If these buttons are not depressed, then the depressions of the data button 25 and the outside line button 24 with a flashing LED in correspondence with the incoming call are monitored in the step 14a. As a result, if all these buttons are not depressed, and a halt of the incoming call resulting from abandonment of the call at a calling side is confirmed in step S15, the in-communication incoming tone at the terminal is stopped, and the displayed information is cleared in step S16. In step S17, the outside line LED which has been kept lit in correspondence with the incoming call is turned off, and the call information memory is released, thus ending processing.

If the depressions of the switching button 26 and the outside line button 24 whose LED is flashing in correspondence with the incoming call are sequentially detected in step S14, the flow advances to step S18 in FIG. 7C, and the present ongoing call is held, and information of the held call is set in the call information memory. In step S19, the corresponding outside line LED is set to a status of flashing in green indicating that its own terminal is in hold condition.

If the depressions of the data button 25 and the outside line button 24 with a flashing LED in correspondence with the incoming call are sequentially detected in step 14a, the flow advances to step S18a in FIG. 7C where processing of releasing the call information memory of ongoing call and disconnecting the outside line is performed. And, in step S19a, an LED corresponding to the disconnected outside line is turned off and the call information memory of that disconnected call is released.

In step S20, it is determined upon comparison between the contents of the call information memory and the contents of the extension setting memory if the communication attribute (communication format such as a transmission rate, a stop bit count, a data bit length, parity information, and the like) included in the call setup message and requested by the calling side at the time when the incoming call comes is matched with that set in the incoming terminal.

If it is determined as a result of comparison that the communication attributes are matched, the in-communication incoming tone is stopped in step S21, and the display unit is cleared in step S22. In step S23, a response message corresponding to the incoming call is sent onto the ISDN in step S23 to complete a response to the incoming call, and the communication channel of the communication system is connected to the ISDN. In addition, the call information memory is set to an in-communication status.

However, if it is determined in step S20 that the communication attributes are not matched (e.g., a case wherein the incoming call designates the communication attribute including "9,600 bps", "stop bit=1 bit", "data bit length=8 bits", and "no parity" when the data adapter telephone set 10 is set with the communication attribute including "1,200 bps", "stop bit=1 bit", "data bit length=7 bits", and "even parity" as shown in FIG. 3 (C)), the setup data of the terminal which is receiving the incoming call (in this case, the terminal is restricted to the data adapter telephone set) are set again in correspondence with the incoming call, and the content of the extension setting memory is also rewritten in step S24. In step S25, in order to inform a change in communication format to a user, a tone is generated at the terminal, and the changed communication format is displayed on the display unit (see FIG. 6(E)). In step S26, a response message to the incoming call is sent on to the ISDN to complete a response to the incoming call, and the communication channel of the communication system is connected to the ISDN. In step S27, the tone generated in step S25 is stopped, the display unit is cleared, and the call information memory is set to an in-communication status.

In step S27a, it is determined if there is a call in hold condition. That is, if there is a held call, that means the call was placed on hold in step S18. Therefore, the flow advances to step S28 in FIG. 7F to perform processings including processing of the held call and ongoing call. If there are no held calls, however, the flow advances to step S77 in FIG. 7D for processing present ongoing call.

Figure 7F:
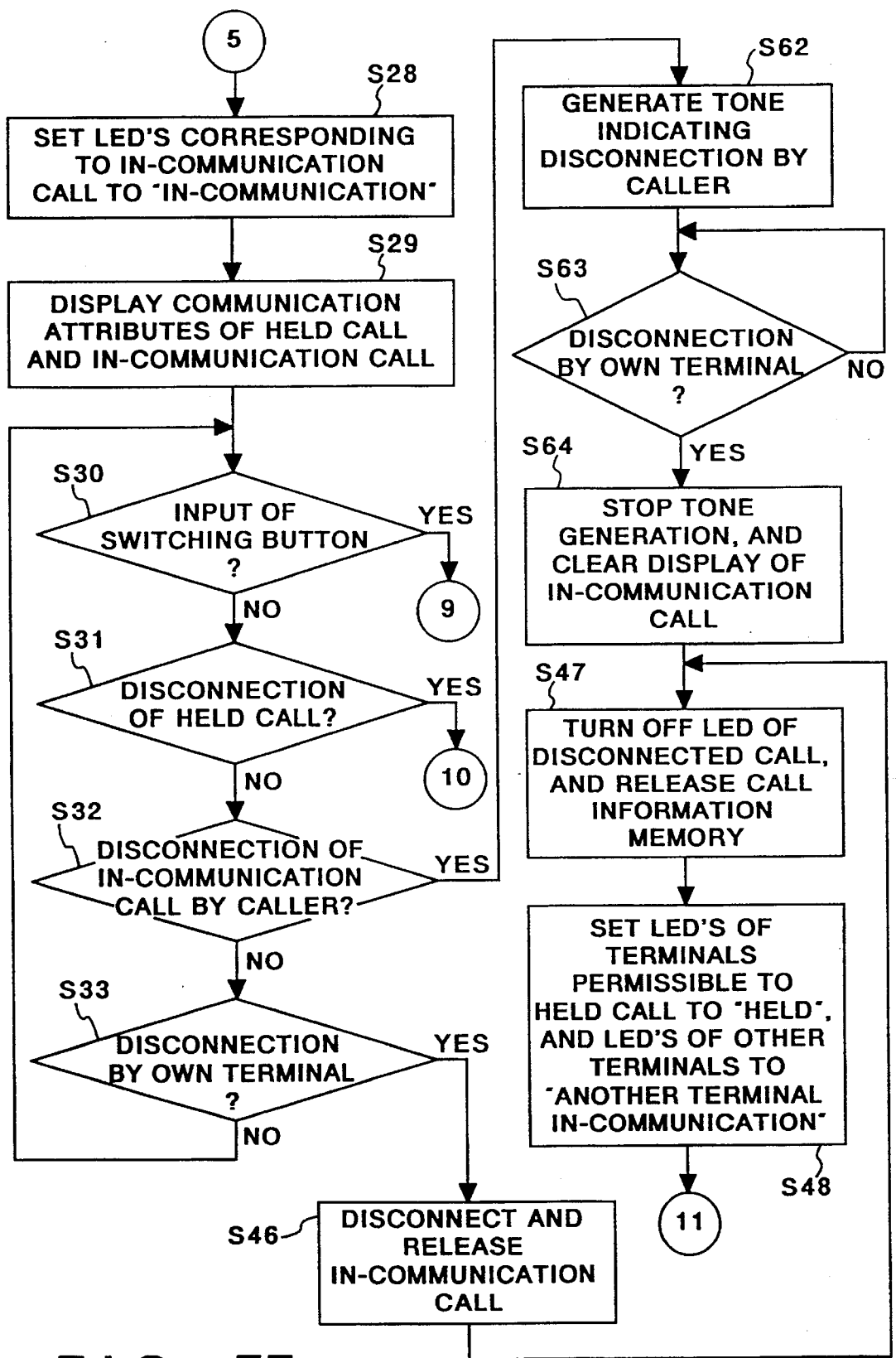

In step S28 in FIG. 7F, the corresponding outside line LED of the terminal in communication is set to a steady lit in green indicating that its own terminal is being in communication, and the corresponding outside line LEDs of other terminals are set to a steady lit in red indicating that another terminal is in communication. In step S29, information (communication format) associated with the ongoing call and the held call is displayed on the terminal in communication (see FIG. 6 (C)).

In steps S30 to S33, depression of the switching button 26, disconnection of the held call, disconnection of the in-communication call by the caller, and disconnection of the call at its own terminal (the call is disconnected upon on-hook in a voice communication, or upon depression of the data button 25 in a data communication) are monitored. More specifically, if the input of the switching button 26 is detected in step S30, the flow advances to step S34 in FIG. 7H, the call in communication is placed on hold and the corresponding information is set in the call information memory. In step S35, the LED of the corresponding outside line button is set to a status indicating that its own terminal is in hold condition, i.e., a slow flashing in green.

In step S36 (See FIG. 7H), it is checked if the communication attribute of the call in the call information memory, in which the call has been requested for switching, i.e., the call which has been in hold condition in step S30 (FIG. 7F), is matched with the communication attribute in the extension setting memory of the terminal which performs the switching operation. If the communication attributes are matched, the held call requested for switching is connected to the terminal, and the content of the call information memory of the connected held call is rewritten as an in-communication status, in step S37 in FIG. 7H. The flow then returns to processing in step S28 in FIG. 7F.

Figure 7G:
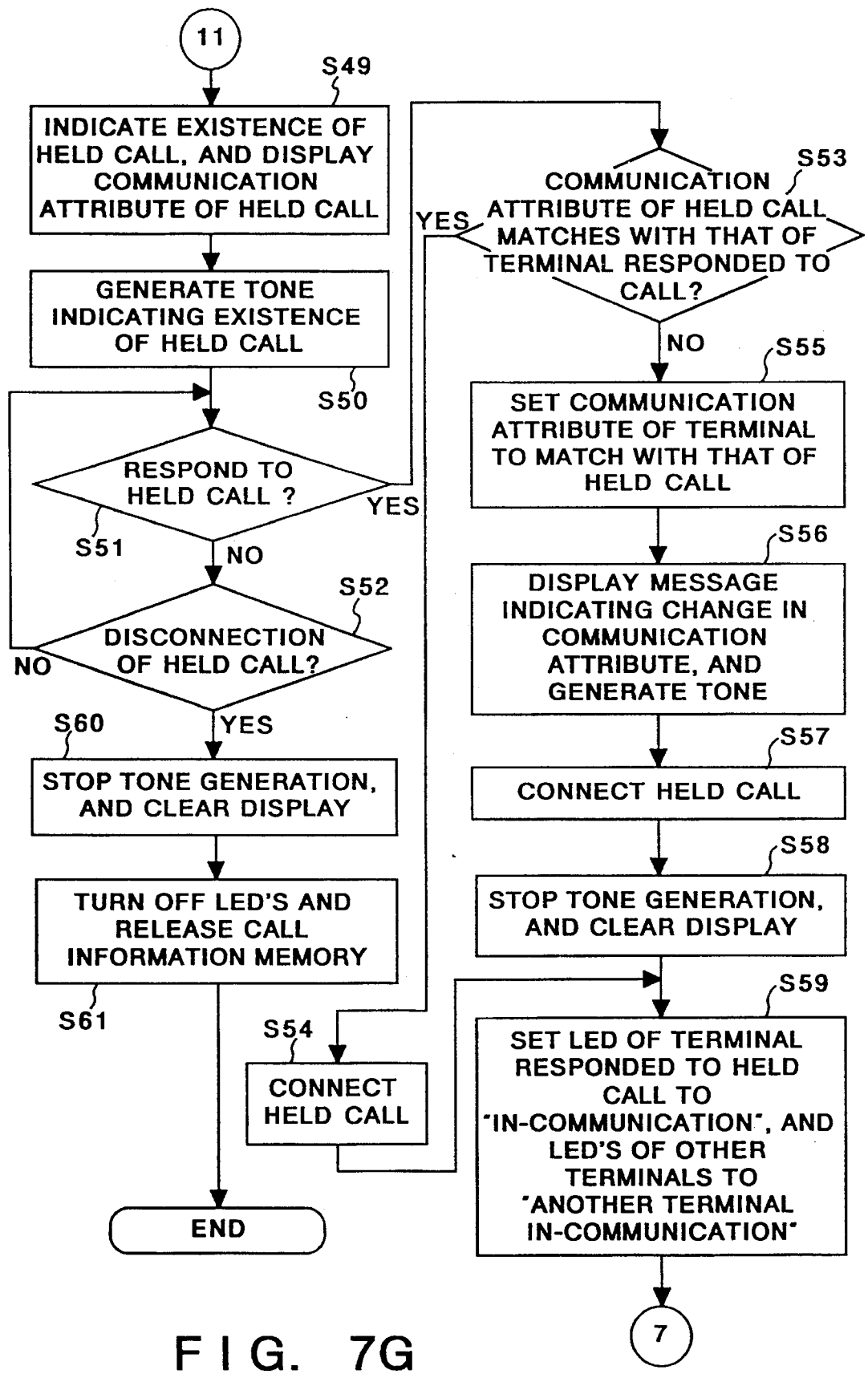
Figures 7H, 7I:
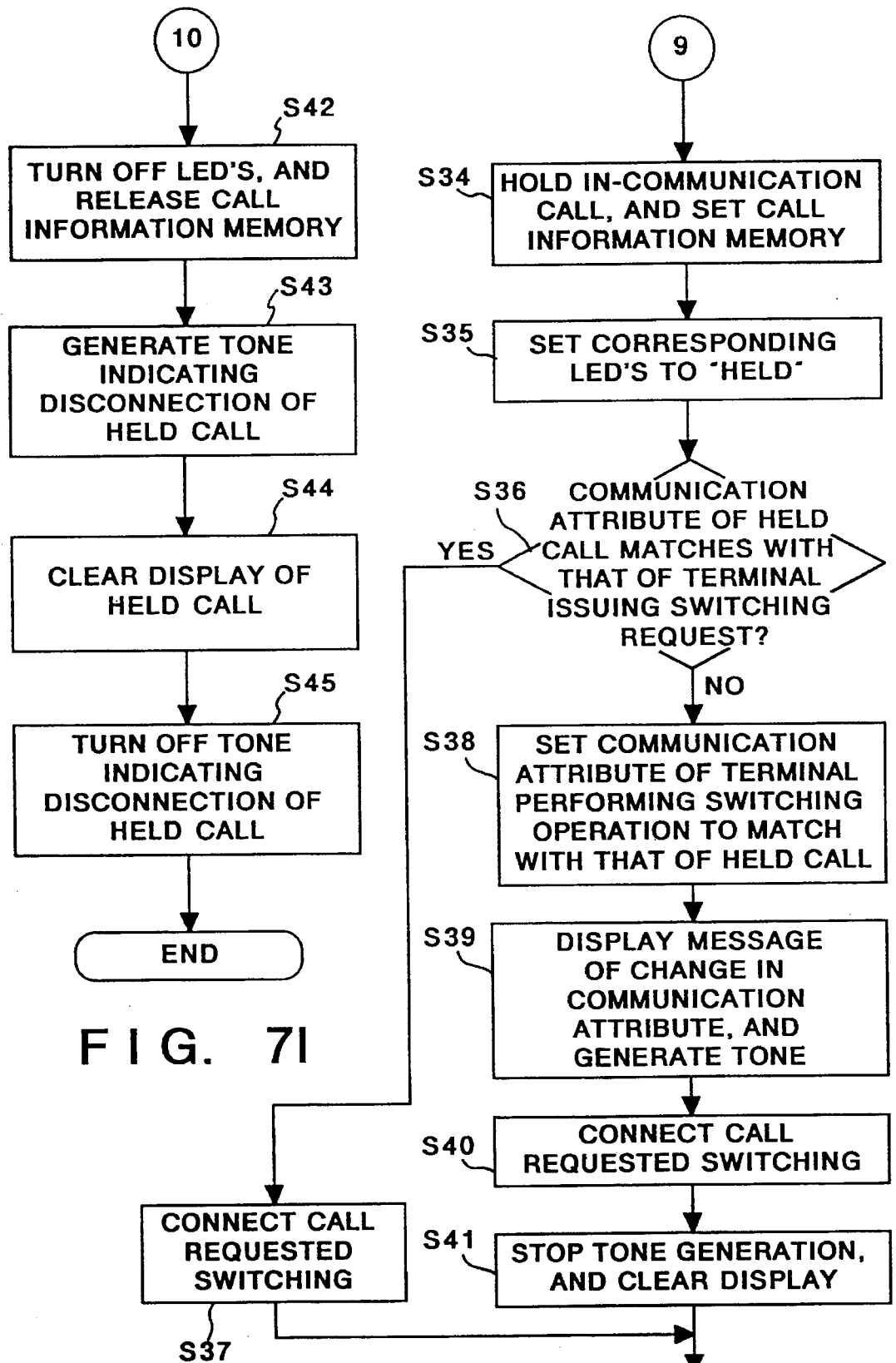

However, if the result of recognition in step S36 is NO in FIG. 7H, the communication attribute of the terminal (data adapter telephone set) which performs the switching operation is set to match with the communication attribute set in the call information memory, and the content of the corresponding extension setting memory is also rewritten, in step S38. In step 39, a change in the communication attribute of this terminal is informed by generation of a tone, and the communication attribute is displayed, in step S39 (see FIG. 6(E)). In step S40, the held call which has been requested for switching is connected to the terminal, the content of the call information memory of the connected held call is changed to indicate an in-communication status, and the flow advances to step S41. In step S41, the tone informing a change in communication attribute is stopped, the display is cleared, and the flow returns to the processing in step S28 in FIG. 7F.

If it is detected in step S31 in FIG. 7F that the held call is disconnected by the caller, the flow advances to step S42 in FIG. 7I. In step S42, the call information memory of the disconnected held call is released, and the flashing LED which indicates the call is in hold condition is turned off. In step S43, a tone for informing that the held call is disconnected is generated, and the display of the held call is cleared in step S44. In step S45, the tone for informing that the held call is disconnected is stopped, thus ending processing.

If it is detected in step S32 in FIG. 7F that the call is disconnected by the calling side, the flow advances to step S62, and a tone for informing that the caller disconnects the call is generated. In step S63, release of its own terminal by disconnection (on-hook in a voice communication or depression of the data button 25 in a data communication) is monitored. If disconnection of its own terminal is detected in step S63, the tone generated in step S62 is stopped, and display of the ongoing call is cleared in step S64. In step S47, the LED corresponding to the outside line of the disconnected call is turned off, and the call information memory of the disconnected call is released.

If disconnection by its own terminal (on-hook in a voice communication or depression of the data button 25 in a data communication) is detected in step S33, release of the call information memory of the ongoing call, and disconnection/release processing of the outside line are executed in step S46, and the flow then advances to step S47.

In step S48, the outside line LED corresponding to the held call of the terminal in hold condition is kept in its own status (slow flashing in green), and LEDs of other terminals which can permit the communication attribute of the held call are set to a status indicating that another terminal is placing the call on hold (slow flashing in red). At the same time, the corresponding LEDs of the nonpermissible terminals are set to a status indicating that another terminal is in communication (lit in red).

In step S49 in FIG. 7G, information associated with the held call, e.g., a message indicating the existence of the held call and the communication attribute are displayed on the terminal in hold condition and other terminals which can permit the communication attribute of the held call. In step S50, a tone for informing the existence of the held call is generated. In steps S51 and S52, a response to the held call (depression of the outside line button corresponding to the held call after an off-hook operation in a voice communication or depressions of the data button 25 and the outside line button corresponding to the held call in data communication), and disconnection of the held call are monitored. If it is detected in step S52 that the held call is disconnected by the caller, the tone is stopped, and display is cleared in step S60. In step S61, the LED corresponding to the disconnected call is turned off, and the call information memory of the held call is released, thus ending processing.

If the response to the held call is detected in step S51, it is confirmed in step S53 if the communication attribute of the held call in the call information memory is matched with that in the extension setting memory of the terminal which has responded to the held call. If it is determined in step S53 that the communication attributes are matched, the responded held call is connected to the terminal in step S54, and the corresponding outside line LED of the terminal is set to a status indicating its own terminal is in communication (lit in green), and LEDs of other terminals are set to a status indicating that another terminal is in communication (lit in red) in step S59. In addition, the call information memory of the connected held call to the terminal is altered to an in-communication status, and the flow then returns to step S78 in FIG. 7D.

However, if it is determined NO in step S53, the communication attribute of the terminal is set to match with that the call information memory, and the extension setting memory is altered in step S55. In step S56, a tone for informing a change in communication attribute and a message associated with it are displayed in step S56 (see FIG. 6(E)). In step S57, the call information memory of the held call is altered to a in-communication status, and the held call requested to respond is connected to the terminal. In step S58, the tone generated to inform a change in communication attribute in step S56 is stopped, and the display is also cleared.

As described above, according to this embodiment, a user can easily determine whether a response to an incoming call or held call can be performed at the given terminal based on LED displays corresponding to an incoming call or a held call at the given terminal accommodated in the communication system. Therefore, the user will never be confused in making a response. Since communication attributes of the call and the terminal are matched simultaneously with a response to an incoming call or held call, the user can be free from troublesome setup operations for matching and wasteful call transfer operations, thus avoiding erroneous responses or erroneous disconnections to incoming or held calls.

Furthermore, since call information, a communication attribute of a terminal, and the like are displayed on a display unit of the terminal every time an operation to respond to an incoming call or held call is performed, the detailed communication attribute can be visually confirmed, and an intercommunication upon matching of the communication attributes can be further assured.

In the above embodiment, whether or not a given terminal is matched with a communication attribute of a call is indicated by indication patterns of an LED corresponding to an outside line button.

Alternatively, such LEDs may be arranged independently of the outside line buttons, or communication attributes of the terminal and the call may be distinguished by a plurality of tones, or colors of LEDs, or a voice message.

As a means for recognizing a communication attribute of a held call or incoming call, information elements (transmission capability, low layer matching characteristics, high layer matching characteristics, or the like) included in a message from the ISDN are used. However, a method of uniquely registering a communication attribute in each unit of outside line trunks may be employed.

In the above embodiment, only when communication attributes between a held call or incoming call and a terminal do not match with each other, the communication attribute of the data adapter telephone set is set to match with the corresponding call. Alternatively, if it is determined that a communication attribute of a held call or incoming call falls within an allowable range of setup change of the data adapter telephone set without checking a status of the communication attribute set in the terminal, the communication attribute of the terminal can be unconditionally set to match with that of the held or incoming call.

Furthermore, the CPU may inform only call information to the data adapter telephone set, and setup of a communication attribute and checking of a possibility of communication may be executed by the data adapter telephone set. Only the results of these executions may be informed to the CPU.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:

recognition means for recognizing a communication attribute of an incoming call;

communication means for communicating via a communication channel which is used in common with other communication apparatus; and display means for performing a common display in a case where a communication attribute of said communication means and the communication attribute of the incoming call are inconsistent, and in a case where the communication channel is used by said other communication apparatus.

2. The apparatus according to claim 1, wherein said recognition means recognizes the communication attribute of the incoming call on the basis of a signal received from an external line.

3. The apparatus according to claim 1, wherein said recognition means recognizes the communication attribute of the incoming call on the basis of a signal received from an ISDN.

4. The apparatus according to claim 1, wherein said communication means includes an adapter to connect an external line and a data terminal.

5. The apparatus according to claim 1, wherein said communication means includes a telephone having an adapter to connect to a data terminal.

6. The apparatus according to claim 1, wherein said communication means communicates with a data terminal.

7. The apparatus according to claim 1, wherein said display means displays in accordance with whether a communication attribute between said communication means and a data terminal matches the communication attribute of the incoming call.

8. The apparatus according to claim 1, further comprising storing means for storing a communication attribute of said communication means.

9. The apparatus according to claim 1, further comprising comparing means for comparing the communication attribute of said communication means and the communication attribute of the incoming call.

10. The apparatus according to claim 1, wherein said display means performs a display by a color in accordance with whether the communication attribute of said communication means matches the communication attribute of the incoming call.

11. The apparatus according to claim 1, wherein said display means performs a display by changing a flashing rate in accordance with whether the communication attribute of said communicating means matches the communication attribute of the incoming call.

12. The apparatus according to claim 1, wherein said display means is provided corresponding to a key for specifying an external line.

13. The apparatus according to claim 1, wherein said display means displays an existence of the incoming call when the communication attribute of said communication means match the communication attribute of the incoming call.

14. The apparatus according to claim 1, wherein the communication attributes of the incoming call includes an attribute of G4 facsimile communication.

15. A communication apparatus comprising:

recognition means for recognizing a communication attribute of a held call;

communication means for communicating via communication channel which is used in common with other communication apparatus; and display means for performing a common display in a case where a communication attribute of said communication means and the communication attribute of the held call are inconsistent, and in a case where the communication channel is used by said other communication apparatus.

16. The apparatus according to claim 15, wherein said recognition means recognizes the communication attribute of the held call on the basis of a signal received from an external line.

17. The apparatus according to claim 15, wherein said recognition means recognizes the communication attribute of the held call on the basis of a signal received from an ISDN.

18. The apparatus according to claim 15, wherein said communication means includes an adapter to connect an external line and a data terminal.

19. The apparatus according to claim 15, wherein said communication means includes a telephone having an adapter to connect to a data terminal.

20. The apparatus according to claim 15, wherein said communication means communicates with a data terminal.

21. The apparatus according to claim 15, wherein said display means displays in accordance with whether a communication attribute between said communication means and a data terminal matches the communication attribute of the held call.

22. The apparatus according to claim 15, further comprising storing means for storing a communication attribute of said data terminal.

23. The apparatus according to claim 15, further comprising comparing means for comparing the communication attribute of said data terminal and the communication attribute of the held call.

24. The apparatus according to claim 15, wherein said display means performs a display by a color in accordance with whether the communication attribute of said data terminal matches the communication attribute of the held call.

25. The apparatus according to claim 15, wherein said display means performs a display by a flashing rate in accordance with whether the communication attribute of said data terminal matches the communication attribute of the held call.

26. The apparatus according to claim 15, wherein said display means is provided corresponding to a key for specifying an external line.

27. The apparatus according to claim 15, wherein said display means displays an existence of the held call when the communication attribute of said communication means matches the communication attribute of the held call.

28. The apparatus according to claim 15, wherein the communication attribute of the held call includes a synchronous communication.

29. The apparatus according to claim 15, wherein the communication attributes of the incoming call includes an attribute of G4 facsimile communication.

30. A terminal exchange apparatus accommodating a plurality of communication channels and a plurality of terminals, each of the plurality of terminals comprising a display unit for displaying states of the plurality of communication channels, the apparatus comprising:

recognition means for recognizing a communication attribute of an incoming call;

discriminating means for discriminating whether each of the plurality of terminals has a communication attribute which matches the communication attribute of the incoming call; and control means for controlling the display unit so as to display, before the plurality of terminals respond to the incoming call, that the communication attribute of the incoming call does not match the communication attribute of the terminal in accordance with a discrimination result by said discriminating means.

31. The apparatus according to claim 30, further comprising storage means for storing a communication attribute of the terminals which the apparatus accommodates, wherein said discriminating means performs the discrimination on the basis of the communication attribute of the terminal stored in said storage means.

32. The apparatus according to claim 30, wherein said control means controls a second display unit on each of the plurality of terminals so as to display the communication attribute of the incoming call which has been recognized by said recognition means.

33. The apparatus according to claim 30, wherein said recognition means recognizes the communication attribute of the incoming call on the basis of a signal received from an external line.

34. The apparatus according to claim 30, wherein said recognition means recognizes the communication attribute of the incoming call on the basis of a signal received from an ISDN.

35. The apparatus according to claim 30, wherein said control means controls second display unit on each of the plurality of terminals so as to display information indicating a calling party.

36. The apparatus according to claim 35, wherein said control means controls the second display so as to display the calling party's number.

37. The apparatus according to claim 30, wherein said discriminating means further comprises means for connecting the incoming call and the terminal when said discriminating means detects a response of the terminal.

38. The apparatus according to claim 30, wherein said discriminating means further comprises means for holding or disconnecting the call which is in-communication when the terminal responds to the incoming call.

39. The apparatus according to claim 30, wherein the plurality of terminals include a telephone having an adapter to connect to a data terminal.

40. The apparatus according to claim 30, wherein said control means controls the display unit which is provided corresponding to a key for specifying an external line, in accordance with whether the terminals can respond to the call.

41. The apparatus according to claim 30, wherein the states of the plurality of communication channels include a busy state.

42. A call processing method in a terminal apparatus accommodating a plurality of communication channels and a plurality of terminals, each of the plurality of terminals comprising a display unit for displaying states of the plurality of communication channels, the method comprising the steps of:

recognizing a communication attribute of a call;

discriminating, on the basis of a recognition result at the recognizing step, whether communication attribute of the plurality of terminals match the communication attribute of the call; and controlling the display unit so as to display, before the plurality of terminals respond to the call, on each of the terminals which has been discriminated as having a communication attribute that does not match the communication attribute of the call, that the terminal can not respond to the call.

43. The method according to claim 42, wherein the communication attribute of the call is recognized at the recognizing step on the basis of a signal received from an external line.

44. The method according to claim 42, wherein the communication attribute of the call is recognized at the recognizing step on the basis of a signal received from an ISDN.

45. The method according to claim 42, wherein at the controlling step, a color of the display unit is changed in accordance with whether the terminal can respond to the call.

46. The method according to claim 42, wherein at the controlling step, a flashing rate of the display unit is changed in accordance with whether the terminal can respond to the call.

47. The method according to claim 42, wherein at the controlling step, the display unit which is provided corresponding to a key for specifying an external line is controlled, in accordance with whether the terminal can respond to the call.

48. The method according to claim 42, further comprising the step of sending a calling signal to the terminal which has been discriminated that the communication attribute of the terminal matches the communication attribute of the call.

49. The method according to claim 42, wherein the call includes an incoming call or a held call.

50. The method according to claim 42, wherein whether the communication attribute between the plurality of terminals and a data terminal matches the communication attribute of the call is discriminated at the discriminating step.

51. The method according to claim 42, wherein at the controlling step, a status of a display of the display unit which is provided on a terminal whose communication attribute does not match the communication attribute of the call, is the same as a status in the case where the external line is used by another terminal.

52. The method according to claim 42, wherein the communication attribute of the call includes an attribute of G4 facsimile communication.

53. The method according to claim 42, wherein the states of the plurality of communication channels include a busy state.

54. The method according to claim 42, wherein the display unit is provided corresponding to a key for specifying an external line.

55. A method of controlling a plurality of displays for displaying states of a plurality of communication channels, comprising the steps of:

discriminating a communication attribute of a call on one of the plurality of communication channels; and controlling one of the plurality of displays corresponding to the one of the communication channels according to a discrimination result obtained in said discriminating step.

56. The method according to claim 55, wherein a communication attribute of an incoming call is discriminated in said discriminating step.

57. The method according to claim 55, wherein a communication attribute of a held call is discriminated in said discriminating step.

58. The method according to claim 55, wherein said one of the plurality of displays performs a common display in a case where the communication attribute of the call does not correspond to a predetermined communication attribute, and in a case where said one of the a plurality of communication channels is used by other communication apparatus.

59. The method according to claim 55, wherein the communication attribute of a call from an ISDN is discriminated in said discriminating step.

60. The method according to claim 55, wherein said one of the plurality of displays, which are constructed to correspond to a plurality of keys for instructing to respond to calls on the plurality of communication channels, is controlled in said controlling step.

61. The method according to claim 55, wherein whether or not the communication attribute corresponds to a predetermined attribute is discriminated in said discriminating step.

62. A communication system for connecting a plurality of communication channels with a terminal, comprising:

discriminating means for discriminating a communication attribute of a call on one of the plurality of communication channels; and transmitting means for transmitting a control signal to the terminal so that one of a plurality of displays, said displays being for displaying states of said plurality of communication channels, performs a display of a state of the one of the communication channels according to the communication attribute discriminated by said discriminating means.

63. The system according to claim 62, wherein said discriminating means discriminates a communication attribute of an incoming call.

64. The system according to claim 62, wherein said discriminating means discriminates a communication attribute of a held call.

65. The system according to claim 62, wherein said transmitting means transmits the control signal so that the plurality of displays perform a common display in a case where the communication attribute of the call does not correspond to a predetermined attribute, and in a case where said one of the plurality of communication channels is used by other terminal.

66. The system according to claim 62, wherein said discriminating means discriminates the communication attribute of a call from an ISDN.

67. The system according to claim 62, wherein said transmitting means transmits the control signal so that said plurality of displays, which are constructed to correspond to a plurality of keys for instructing to respond to calls on the plurality of communication channels, perform the display.

68. The system according to claim 62, wherein said discriminating means discriminates whether or not the communication attribute corresponds to a predetermined attribute.

69. A method of controlling a display for displaying a state of a communication channel which is used in common by a plurality of terminals, comprising the steps of:

recognizing a communication attribute of a call on the communication channel; and controlling the display so as to perform a display in a case where the communication attribute of the call is inconsistent to a predetermined attribute, and in a case where the communication channel is used by one of the plurality of terminals.

70. The method according to claim 69, wherein a communication attribute of an incoming call is discriminated in said recognizing step.

71. The method according to claim 69, wherein a communication attribute of a held call is discriminated in said recognizing step.

72. The method according to claim 69, wherein the communication attribute of a call from an ISDN is discriminated in said recognizing step.

73. The method according to claim 69, wherein one of a plurality of displays is controlled in said controlling step.

* * * * *